United States Patent [19]

Le Chatelier et al.

[11] Patent Number: 4,782,879

[45] Date of Patent: Nov. 8, 1988

[54] HYDRAULIC OR PNEUMATIC PRESSURE CONTROL DEVICE AND ITS APPLICATION IN DEVICES REGULATING THE PRESSURE OF TIRES OF VEHICLES IN MOTION

[75] Inventors: Robert Le Chatelier, Paris; Jean-Jacques Diefenbach, Sannois, both of France

[73] Assignee: Precision Mecanique Labinal, France

[21] Appl. No.: 39,456

[22] PCT Filed: Oct. 4, 1985

[86] PCT No.: PCT/FR85/00276

§ 371 Date: Apr. 14, 1987

§ 102(e) Date: Apr. 14, 1987

[87] PCT Pub. No.: WO87/01062

PCT Pub. Date: Feb. 26, 1987

[51] Int. Cl.$^4$ ................ B60C 23/10; B60C 29/00
[52] U.S. Cl. .................................... 152/417; 137/225; 141/38
[58] Field of Search ............... 152/415, 416, 417; 137/224, 225, 102; 141/38

[56] References Cited

U.S. PATENT DOCUMENTS

| | | | |
|---|---|---|---|
| 4,313,483 | 2/1982 | Brockmann | 152/416 |
| 4,456,038 | 6/1984 | Gwaltney et al. | 152/415 |
| 4,470,506 | 9/1984 | Goodell et al. | 152/416 |
| 4,583,566 | 4/1986 | Kalavitz et al. | 152/416 |
| 4,619,303 | 10/1986 | Bryan et al. | 152/415 |
| 4,640,331 | 2/1987 | Braun et al. | 152/416 |
| 4,641,698 | 2/1987 | Bitoni | 152/416 |
| 4,678,017 | 7/1987 | Schultz | 152/416 |

Primary Examiner—Michael S. Marcus
Assistant Examiner—Richard D. Jordan
Attorney, Agent, or Firm—Larson and Taylor

[57] ABSTRACT

The device comprises, in a housing formed from two parts (102,103), disposed on opposite sides of a diaphragm (104), three orifices, namely an orifice (105) capable of receiving the low and high pressure and ensuring the purge, the second (107) connected to the pneumatic tire, and the third (106) of large diameter for a rapid escape, an escape valve (110) being normally closed while a passage (116) between the first and second orifices is normally closed and a passage (121) of large diameter between the second orifice and the escape valve (110) is normally open. Application in the measurement, the inflation and the deflation of vehicle pneumatic tires.

25 Claims, 4 Drawing Sheets

HYDRAULIC OR PNEUMATIC PRESSURE CONTROL DEVICE AND ITS APPLICATION IN DEVICES REGULATING THE PRESSURE OF TIRES OF VEHICLES IN MOTION

FIELD OF THE INVENTION

The present invention relates to a device for controlling hydraulic or pneumatic pressure for regulating, reducing or increasing the pressure in a chamber, such as a jack or a vehicle tire. The invention also concerns the application of this device to the regulation of pressure, namely inflating and deflating tires on vehicles in motion.

BACKGROUND OF THE INVENTION

Various devices already exist of the electrovalve or directional valve type, whereby it is possible to regulate the pressure in a chamber such as, for example, a jack or a tire.

These devices have only limited possibilities or present complications owing to their complexity and the necessity of inserting electric controls in situ.

SUMMARY OF THE INVENTION

An object of the present invention is to overcome these drawbacks and to provide a hydraulic or pneumatic pressure control device operating solely by pressurized fluid control means, so that any electric interface is avoided.

Another object of the invention is to provide such a device which may be remote controlled with a single source of pressure.

Another object of the invention is to provide such a device which is capable of operating rapidly and permits the passage of very large fluid flows.

Another object of the invention is to provide such a device which is capable of operating under extremely difficult conditions of environment, temperature, humidity, dust, shocks, vibrations and frost in particular.

Another object of the invention is to provide such a device which does not require the permanent presence of a control or supply pressure.

Another object of the invention is to provide a device whereby it is possible to achieve the seal, for eample on tires, with a single valve and therefore to obtain a safety comparable to a conventional inflating valve.

Another object of the invention is to guarantee a very high reliability of the operation of the escape so as to permit a rapid escape and, in the case of use on vehicle tires, a rapid deflation of the tire.

A further object of the invention is to provide such a device whose purging is easy.

A further object of the invention is to provide such a device which is simple and cheap.

The invention provides a hydraulic or pneumatic pressure control device, of the type adapted to be interposed between a source of pressure, a utilization chamber such as in particular a jack or a pneumatic tire, and an escape, such as for example a purge communicating with the open air, to permit ensuring at will the feeding of fluid under pressure to said chamber or reservoir and the discharge of fluid under pressure from said reservoir to the escape, and therefore comprising a firt orifice for connection to the source of pressure, preferably through a conduit, a second orifice for connection to the utilization reservoir, preferably through a conduit, and a third escape or purge orifice which may be connected in particular to the open air, characterized in that it comprises in a body suitably provided with the three orifices, means responsive to a first control pressure of low value for connecting the utilization reservoir to the escape, and means responsive to a second pressure of high value, which may be the supply pressure coming from the source of pressure, for putting said reservoir in communication with said source of pressure and precluding a communication between said reservoir and the escape.

Preferably, said means are so arranged that the low pressure or the high pressure is conveyed to the device through a single orifice, in the present instance the first orifice connecting the device to the source of pressure.

The aforementioned responsive means may be for example the slides conventionally employed in the hydraulic or pneumatic field, but said means preferably comprise clack valves or valves controlled by diaphragms.

Preferably, the third orifice, or escape orifice, is normally in the closed state, for example closed by a clack valve, the latter being responsive, for its opening, to the pressure established in a valve control chamber capable of being connected, preferably in the region of said first orifice, to means establishing the low pressure.

Consequently, in the normal state, i.e. when no pressure of low value is sent to the device, the escape valve remains closed and the escape orifice is protected against soiling, the risk of deterioration and frost.

In a preferred embodiment, the device comprises a limited number of chambers which must be purged, said chambers being connected to said first orifice so as to be capable of being purged by a general purge of a pipe connected to said first orifice.

In the aforementioned case where the escape valve is normally closed, the device may have only a single chamber to be purged, namely the chamber controlling the escape valve.

Advantageously, a passage between the first orifice adapted to be connected to the source of pressure and the second orifice adapted to be connected to the utilization reservoir or pneumatic tire, is normally closed by a valve subjected to a closing action, such as the first pressure of low value, is incapable of producing its opening so that said low pressure value is solely sent to the chamber controlling the escape valve.

Particularly advantageously, the second orifice connected to the tire is connected to the escape valve through an escape passage which is normally open but is capable of being closed by a valve which is not responsive to the first, low control pressure but responsive to the second pressure of high value for the inflation, and this valve can be particularly simply and cheaply mechanically connected to the valve closing the passage between the first orifice and the second orifice, the passage between the first orifice and the second orifice being therefore closed when the passage between the second orifice and the escape orifice is open and vice versa.

This device may be constructed in a particularly simple manner by using diaphragm valves with, for example, a single diaphragm held between two parts of a housing which are disposed one against the other on each side of the diaphragm, with, in a first suitable inner space connected to the escape, the escape valve located on one side of the diaphragm and the escape valve control chamber located on the other side, and, in a second inner space, a double valve, one disposed on one side of the diaphragm for closing the first orifice connected to the source of pressure and the other on the other side for closing, when it is shifted, the passage between the second orifice and the escape.

Consequently, when it is desired to cause the inflation, the establishment of the high pressure causes first of all the opening of the escape valve and a brief escape reducing the pressure under the normally open valve connecting the second orifice to the escape orifice while the valve closing the passage between the first orifice and the second orifice opens so that, in the same movement, the associated valve closes the passage between the second orifice and the escape, after which, owing to a delay produced by a pressure drop or a suitable shape of the passage between the first orifice and the second orifice, the high inflating pressure reaches the second orifice.

The brief escape thus produced cleans the escape passage and valve.

In a different embodiment of the invention, the device comprises a normally closed utilization valve preferably closed by the action of a spring, for closing said second orifice or utilization orifice, said valve being responsive to a low or high pressure established in a control chamber of the valve directly connected to the first inlet orifice, an escape valve which is normally open but is capable of closing said third orifice or escape orifice for closing a passage between the escape orifice and the utilization valve communicating with said second orifice, which is normally closed by the utilization valve, a normally closed control valve for closing a passage between the first orifice or inlet orifice and a chamber controlling the escape valve, and a calibrated valve normally closing a passage between the first orifice or inlet orifice and the second orifice or utilization orifice, capable of being opened when the inlet pressure is sufficient after the escape valve has been brought to its closed position.

According to the invention, in the state of rest, the utilization valve, the calibrated valve and the control valve are closed while the escape valve is open. If a low pressure impulse is fed through the first orifice, the establishment of this low pressure which has an effect in the chamber controlling the utilization valve, causes the opening of said utilization valve while the calibrated valve remains closed, the pressure being insufficient to open it, while the control valve also remains closed, the pressure being insufficient to open it. As the escape valve is therefore open, the air under pressure of the utilization reservoir can be discharged through the second orifice and through the passage leading to the third orifice for achieving a reduction in pressure of even a complete purge.

On the other hand, if a high pressure is fed through the first orifice, there is obtained, as before, the opening of the utilization valve but also, in a first stage, the opening of the control valve, which brings the pressure to the active chamber controlling the escape valve, which results in the closure of the last-mentioned valve so that the escape is no longer possible. As the value of the pressure continues to increase at the inlet, the calibrated valve opens in turn and the inlet orifice is then connected to the second orifice or utilization orifice whereby the fluid under pressure can be fed to the utilization reservoir through the second orifice which is no longer closed by the utilization valve. The elimination of the high pressure through the first orifice enables the device to be returned to the state of rest.

Preferably, as mentioned, the valves are controlled by diaphragms disposed in active chambers which tend to cause the displacement of the diaphragm and the opening of its valve, namely a chamber controlling the utilization valve, a chamber controlling the control valve, and a chamber controlling the escape valve for causing the closure of said valve, it being possible to arrange that the calibrated valve or devoid of a diaphragm and directly actuated since it only has to be responsive to the action of the high pressure when the latter is fully established.

In a preferred embodiment, the device may further comprise different internal purge pipes for purging the dead chambers disposed on the inactive sides of the diaphragms and a check valve disposed in the pipes for protecting them and the dead chambers from exterior impurities.

The different valves or diaphragms are maintained in their normal position, in the absence of low or high pressure, by conventional return springs.

The invention may be applied to various utilizations such as, for example, the control and regulation of a jack.

According to the invention, the device may also be applicable to the regulation of the pressure of pneumatic tires of vehicles in motion.

Various devices are already known for regulating the pressure of tires of vehicles in motion.

Thus the French Pat. No. 2,357,388 in the name of WABCO WESTINGHOUSE, discloses a regulating device for the variation of the pressure in the pneumatic tires of vehicles in motion in which the different tires are connected, through pipes having rotating couplings on the axis of the wheels, to a directional valve formed by a complex electrovalve. This device does not permit the regulation of the different tires independently of each other. Above all, it requires an inflation or deflation by intermittance so as to be able to put the system each time in a stable state so as to be able to measure the value of the pressure and, by comparing this value with the desired value, continue the regulation until concordance is obtained.

The French Pat. No. 2,499,476 in the name of ROBERT BOSCH discloses a device adapted to overcome this drawback. This device is complex and has a rather large number of electrovalves and a pneumatic comparator so as to constantly establish a comparison between the pressure in the central pipes and the previously indicated value. Further, it requires a centralization of the purge and is highly complex as concerns the pipes.

The French Pat. No. 2,507,971 in the name of ROBERT BOSCH discloses a similar device adapted to the regulation of the pressure in each of the individual tires with the same drawbacks as in the aforementioned device.

The French Pat. No. 2,503,639 in the name of THE BUDD COMPANY discloses a device for regulating the pressure in the tires of vehicles which has the drawback of requiring the permanent presence of a pressure in the pipes and the rotating couplings of hollow axles with a rapid wear of these couplings.

The French Pat. No. 2,465,602 in the name of BENNES MARREL also discloses a device of this type involving the control of a wheel check valve by means of a pneumatic control pipe. This device therefore requires the use of a double pipe and moreover, for reasons of the reading of the pressure, it is arranged to maintain the pressure constantly inside all of the pipes with consequences concerning the wear of the rotating couplings.

The U.S. Pat. No. 2,685,906 in the name of Selden T. WILLIAMS, discloses a device for regulating the pressure of air individually in the different tires, in whicn the measurement of the pressure requires the presence of compressed air in the fixed conduits while the purging can only be carried out through fixed pipes by return to the directional valve.

An object of the invention is to overcome these drawbacks and to provide, owing to the application of the control device according to the invention, a device for regulating the pressure of pneumatic tires of vehicles in motion which is simple, reliable, capable of operating under extreme conditions as concerns environment, temperature, humidity, which avoids the use of rotating couplings in the region of the axles which permits a rapid regulation of the pressure in the tire which may eliminate the stages for measuring pressure in the pipes and which avoids the necessity of particular pneumatic or electric control circuits in the region of the various individual wheels.

A preferred object of the invention is to apply the control device according to the invention to the regulation of the pressure of tires of vehicles in motion, preferably by disposing such a device for each of the wheels or groups of wheels which must be subjected to a given regulation, the device or devices being each connected through pipes to central control means capable of being controlled by the operator and connected to a source of air or fluid under pressure, said central control means being adapted to be capable of establishing in said pipes three states, namely a state of rest in which the pipes are at ambient pressure, for example atmospheric pressure, a state of low pressure which is different from the ambient pressure, and a state of high pressure corresponding to the inflating pressure.

Advantageously, each tire provided with a device according to the invention is connected, preferably through a single pipe and a selecting valve, to means establishing the first control pressure of low value, for example through a check-valve, to means for establishing the pressure of high value, and to purge means, it being possible to advantageously dispose a pressure measuring element downstream of the check valve.

These various means may be grouped into a single unit; although it is also possible to connect the pipe coming from the tire, on one hand, to a low-pressure electrovalve and, on the other hand, to a high-pressure electrovalve, it being possible to effect the purge through either valve. Preferably, the pipe leading from the tire is alternately connected to either one of these electrovalves through a selecting valve. Advantageously, a check-valve may be provided in the path toward that one of the electrovalves which does not control the purge, in particular for avoiding transfers from one tire to the other.

Pressure measurements may be effected either by means of a sensor mounted on the wheel of the tire and coupling means, such as defined in the French Pat. No. 2,497,342, or by means of sensors mounted on the chassis of the vehicle in the region of the fixed pipe leading from the tire.

The various measuring elements are advantageously connected to a central control calculator which controls the various electrovalves of the system and reads the measurements so as to cause the deflation or inflation of the tires.

The calculator can thus read, right at the start of the deflation, the pressure prevailing in the tire and it deduces therefrom the time required for the deflation. At the end of this time, it eliminates the first control pressure and purges the concerned passage and the deflation stops with no readjustment being generally necessary.

The inflating time is less well controlled owing to possible fluctuations in the source of pressure, and it is therefore preferred to cease the inflation at the end of a certain calculated period of time, after which the pressure is readjusted if required.

BRIEF DESCRIPTION OF THE DRAWINGS

Further features and advantages of the invention will be apparent from the following description which is given by way of a nonlimiting example with reference to the accompanying drawing in which.

DESCRIPTION OF THE PREFERRED EMBODIMENTS

Figure 1:
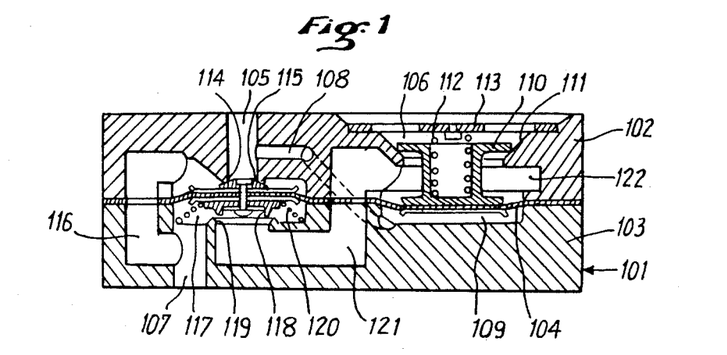
FIG. 1 is a diagrammatic sectional view of a device according to the invention.
Figure 2:
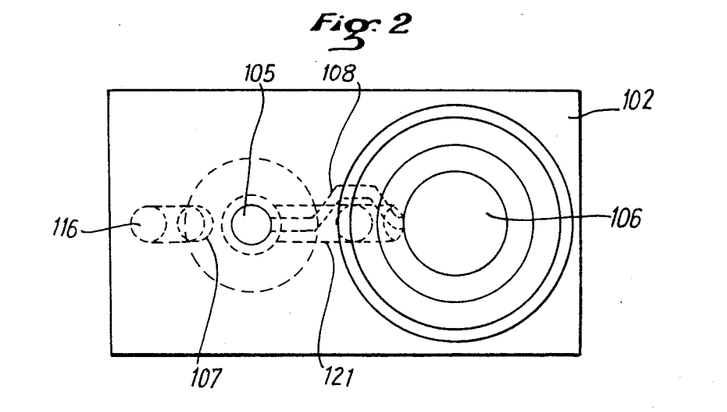
FIG. 2 is a diagrammatic plan view showing the various passages provided in this device.

Reference will first of all be made to FIGS. 1 and 2.

The illustrated device may be constructed in the form of a housing having a substantially rectangular shape 101 comprising two semi-housings 102, 103 between an elastic diaphragm 104 is held. The housing part 102 has a first orifice 105 adapted to be connected to pressure establishing means capable of establishing three pressure levels, namely ambient pressure, a first control pressure of low value, for example higher than the ambient pressure, and a second inflating pressure higher than the preceding pressure. The housing part 102 also has an escape orifice 106 and the housing part 103 has the second orifice 107 connected to the utilization reservoir, for example the pneumatic tire of the vehicle.

The first orifice 105 is connected through a passage 108 extending through the diaphragm 104, to a chamber 109 located under the diaphragm in the housing part 103 and adapted to control the opening of a valve 110 or escape valve normally biased against its seat 111 by a spring 112 which bears against a bearing surface 113 disposed in the middle of the escape passage 106 where it is supported by conventional radial arms between which are spaces forming the escape passage 106 proper.

The first orifice 105 terminates in a seat 114 against which normally bears a valve 115 carried by the diaphragm 104. This valve 115 thus closes the connection between the orifice 105 and a passage 116 which has an elbow shape as can be seen, this passage 116 extending through the diaphragm 104 and entering the orifice 107. This orifice 107 communicates with a normally open space 117 under the valve 118 which is capable of cooperating with a seat 119, there being provided a spring 120 which opposes the closure of the valve 118. The volume 117 is connected through a passage 121 of large cross section relative to the valve 110, the sides of the latter being moreover so arranged that the escape through the large-section passage 121 and then the valve is very rapid.

The device operates in the following manner.

When the first orifice 105 is at ambient pressure, i.e.: atmospheric pressure, the different valves are in the position shown in FIG. 1. The pressure prevailing in the pneumatic tire of the vehicle, for example on the order of three bars, is established, on one hand, in the space 117 and in the passage 116, and, on the other hand, in the passage 121 and in its part 122 opening onto the valve 110. The spring 120 also maintains the valve 115 in its closed position and consequently the valve 118 is open.

In order to produce a deflation, a low pressure, for example on the order of 0.5 bar, is fed to the orifice 105. This pressure acts on the valve 115 but is insufficient to overcome the action of the spring 120, the pressure on each side of the diaphragm in the region of the valves 115 and 118 is in equilibrium, on one hand, in the chamber 117, and, on the other hand, in the outlet of the passage 116 above the diaphragm 104. On the other hand, this first pressure established in the chamber 109 is sufficient to overcome the action of the spring 112 so that the valve 110 opens and there occur, owing to the large sections of passage, a rapid escape and a reduction in pressure which is just as rapid in the tire. When the first pressure of low value is suppressed, the orifice 105 is returned to atmospheric pressure and the valve 110 is closed, the chamber 109 being purged through the orifice 105 and the pipe connected to the latter.

To produce an inflation, a second pressure of high value, for example of 6 bars is established in the orifice 105. This pressure is sufficient to overcome the action of the spring 120 and the valve 115 is opened. Simultaneously, the pressure increase is transmitted to the chamber 109 and the escape valve 110 is opened. The air under pressure in the chamber 117 and the passage 121 escapes and produces an acceleration of the movement of the valves 115 and 118 and the valve 118 closes. The escape valve still remains open but no further escape occurs. At this moment, owing to the delay caused by the elbow configuration of the passage 116, the high pressure reaches the second orifice 107 and the inflation of the tire commences. When the pressure of high value is interrupted and the orifice 105 is put back into communication with atmospheric pressure, the inflation is interrupted and the various valves resume their normal positions shown in FIG. 1, the chamber 109 then being purged through the conduit 108 and the orifice 105.

Figure 3:
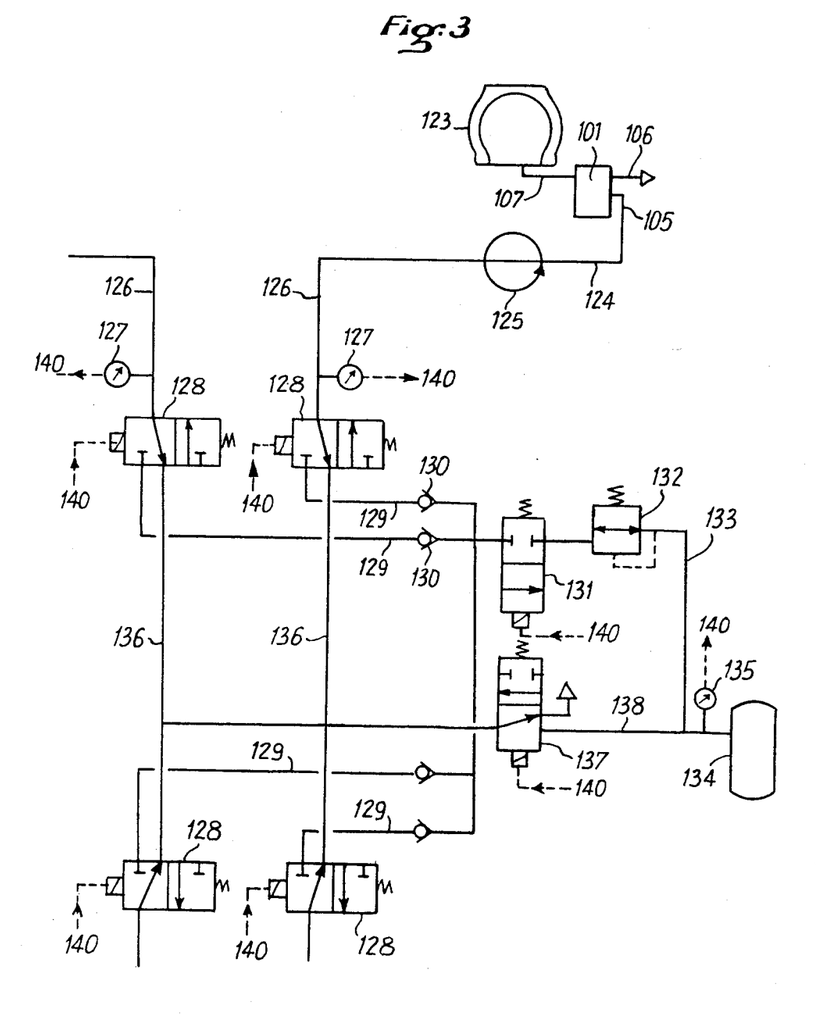
FIG. 3 is a diagrammatic view of an installation on a vehicle.
Figure 4:
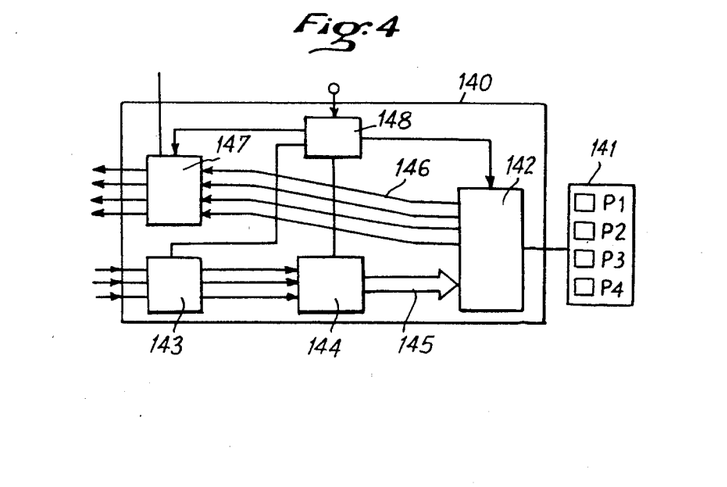
FIG. 4 is a diagrammatic view of a control computer for this installation.

Reference will now be made to FIGS. 3 and 4.

The various tires, only one of which is shown at 123 and which are four in number in the described embodiment, are each associated with a device 101. The orifice 105 of the device 101 is connected through a pipe 124 to a rotating sealed coupling 125 between the rim and the stub-axle of the wheel permitting the connection between the pipe 124 and a pipe 126 mounted on the chassis of the vehicle and connected to a pressure measuring unit 127 which converts the pressure parameter into an electric signal, for example a voltage. The pipe 126 leads to a three-way selecting electrovalve 128 controlled by the computer or calculator. One of the ways of the electrovalve 128 is connected through a pipe 129 and a check-valve 130 to a low-pressure electrovalve 131 common to the four pipes 129 and receiving the low pressure through a low-pressure regulator 132 and a pipe 133 from a source of pressure 134 such as a compressor. A pressure measuring unit 135 informs the calculator of the pressure at the source 134. The other pipe 136 constituting the inflating way and leading from the electrovalve 128, is connected to a three-way high-pressure control electrovalve 137, the second way being connected through the pipe 138 to the source 134 and the third way being connected to a general purge.

The four electrovalves 128, the low-pressure electrovalve 131 and the high-pressure electrovalve 137 are controlled by the calculator which receives also the electric signals corresponding to the pressure measurements of the four measuring units 127 of each of the wheels and of the measuring unit 135 of the source of pressure.

The source of pressure, which generally includes a compressed air reservoir which may also serve for other uses on the vehicle, may also be completed by a small additional reservoir so as to allow a deflating sequence in the event of a breakdown of the source.

The calculator 140 includes a control panel 141 provided with buttons, namely four buttons each corresponding to a pre-set inflation level, namely the levels P1, P2, P3, and P4, this panel being controlled by the driver of the vehicle. The calculator further comprises calculating means 142 responsive to the various pressure signal values it receives from the sensors 127 through a pressure signal adapter 143 of an analog-digital converter 144 and a bus 145. The control signals issuing from the calculating means 142 are fed through the ways 146 to a valve controlling interface 147 and thence to the control coils of the electrovalves. A stabilized 124 volt supply 148 supplies power to the whole of the calculator.

The device operates in the following manner:

It will be assumed that the four wheels of the vehicle are inflated normally to one of the aforementioned levels, for example P2 (for travel over easy ground). The device 101 is in the state shown in FIG. 1. The pipes 126 are connected by the valves 128 to the pipes 136 and thence to the electrovalve 137 which is open in the direction of the general purge.

To obtain a measurement of the pressure of the tires, the electrovalve 137 is connected to the source of pressure 134 and a brief high-pressure pulse is sent to the device 101 which opens the valve 115, as has been already explained. The electrovalve 128 of the tire is then immediately shifted to the conduit 129 after which the supply of high pressure is stopped by returning the electrovalve 137 to the purge. As the valve 115 is opened, the pressure of the tire will be established in the pipes 126 and 129 up to the valve 130 and the unit 127 will measure it. The electrovalve 128 is shifted again so as to put it into communication with the pipe 136 and the purge and the system returns to its initial state.

In order to reach a lower pressure level, for example P3 (for travelling over sand and snow), and therefore to deflate the tires, the desired pressure P3 in said tires is inserted on the control panel. The calculator first of all starts up the aforementioned measuring sequence. As it then knows the values of the pressure in the various tires, it deduces the time required for deflating to reach the lower desired pressure value in the tires as a function of a previously memorized algorithm. Indeed, the duration of the deflation between an initial pressure and a final pressure is practically independent of other considerations. The calculator then feeds to the tires the low pressure through the electrovalve 131 and the electrovalves 128 which are set in the correct position for the previously calculated durations. At the end of each duration, the concerned selecting electrovalve 128 is immediately shifted to the pipe 136 and the purge.

For inflating the tires, for example from level P3 to level P2, one also starts with the aforementioned pressure measuring step. The calculator deduces the inflating durations for each tire. After this, with the electrovalves 128 communicating with the pipe 136, it opens the electrovlvle 137 connected to the source 134. At the end of each pre-calculated duration, the concerned electrovalve 128 is shifted so as to put it into communication with the pipe 129 and one preceeds to a new measurement. If this measurement is in conformity with the desired pressure value in the tire, the procedure stops for the considered tire by connecting its valve 128 to the electrovalve 131. Otherwise, a new shorter duration is determined and a new inflating (or deflating) step occurs, and so on.

Consequently, generally the inflating step is longer than the deflating step which only requires a single initial measurement. However, this is of no consequence, since, in practice, it is important to be in a position to rapidly deflate the wheels when the vehicle desires to leave, for example, a road having a hard surface for a loose ground over which it can travel only with deflated wheels, whereas when it returns to a hard surface from loose ground, it may continue its journey before the high-pressure value in the tire has been reached.

Preferably, in normal use, there is regularly produced, for example every five minutes, a measuring stage so as to control the state of the tires and take the necessary steps, as the case may be. Further, the brief escape which occurs at the beginning of each measuring stage results in a repeated cleaning of the escape orifice.

Figure 5:
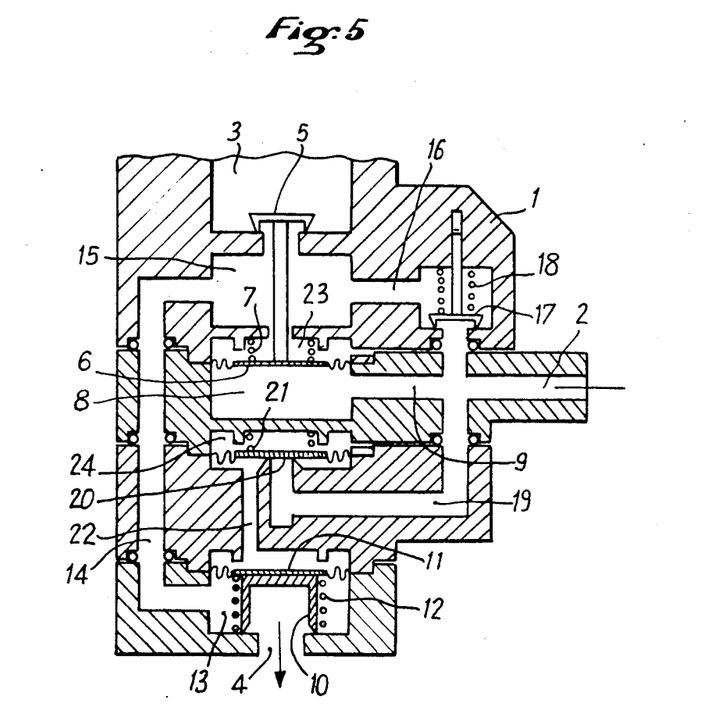
FIG. 5 is a diagrammatic view of a device according to another embodiment of the invention.

Reference will now be made to FIG. 5.

The illustrated device has a body or housing 1 which is preferably of metal and is provided with three orifices, namely an inlet orifice 2, a utilization orifice 3, and an escape orifice 4. The inlet orifice is adapted to be connected, for example through a pipe, to means for establishing two pressure states, namely a low presure and a high pressure, for a duration which is preferably adjustable and may be long. In the absence of high or low pressure, this pipe and the orifice are put in communication with the ambient pressure, for example with atmospheric pressure, which is lower than the low pressure.

The orifice 2 is constantly open while the orifice 3 is normally closed by a valve 5 connected by a conventional rod to a valve actuating diaphragm 6 which is biased to the closing position by a return spring 7 acting on one of the sides of the diaphragm. Consequently, the valve is normally closed under the effect of the spring 7 and under the effect of the high pressure normally prevailing on the downstream side of the orifice 3 in the utilization volume, such as a pneumatic tire or a jack with which it is associated. The active side of the diaphragm 6 forms one of the walls of a control chamber 8 directly connected through a passage 9 to the orifice 2.

The escape orifice 4 is normally open and may be closed by an escape valve 10 which is actuatable to the closing position by a diaphragm 11 which is biased to the opening position of the valve 10 by a return spring 12. The escape valve 10 is movable in a chamber 13 connected through a passage 14 to a chamber 15 disposed just on the upstream side of the utilization orifice 3 and its valve 5. This chamber 15 is also connected through a passage 16 to the passage 9 and to the orifice 2 through a calibrated valve 17 which is normally maintained in its closing position under the action of a sufficiently strong calibrated spring 18 so as to remain closed at the ambient pressure and at the low pressure but to be capable of opening when the high pressure is established in the passage 9.

The other passage 19 leading from the passage 9 connected to the orifice 2 reaches a control or piloting valve 20 which is normally closed by a spring 21 and which, when open, puts the passage 19 in communication with the active side of the diaphragm 11 through a passage 22.

Passages (not shown) permit putting in communication with the ambient pressure, for example atmospheric pressure, the dead chambers, i.e.: the chamber 23 which contains the spring 7 of the diaphragm 6 and the chamber 24 which contains the spring 21. A check-valve can protect these last-mentioned passages from soiling matter from the exterior environment.

The operation of this device will now be described in assuming that the orifice 3 is connected to the interior of the inner tube of a pneumatic tire of a vehicle, in which case the fluid employed is a gas such as air, but the same description would apply in the case of the use of a hydraulic liquid, for example if the device served to control a jack instead of a tire.

The device according to the invention is capable of assuming three stable states, namely a state of rest, a state of deflation and a state of inflation. In the state of rest, as seen hereinbefore, the atmospheric pressure prevails in the whole of the device and the valve 5 is in the closed position under the action of the pressure of the tire in the orifice 3 and the action of the spring 7. The escape valve 10 is open, as opposed to the position shown in FIG. 5, under the action of the spring 12. The valve 20 is in the closed position under the effect of the spring 21.

In order to bring about the deflating state in starting with the state of rest, low pressure is fed to the orifice 2, this low pressure being of course higher than the atmospheric pressure. This low pressure, which is insufficient to open the valve 17 normally closed by its spring 18, is established in the chamber 8 and causes the opening of the valve 5 and consequently the escape of the fluid contained in the tire which, in passing through the chamber 15, passes through the passage 14 and then the chamber 13 and escapes through the orifice 4. During this time, the valve 20 remains in the closed position since the low pressure which is established in the passage 19 is insufficient to overcome the force exerted by the spring 21.

When the low pressure is ceased, the valve 5 is closed again and the device resumes its state of rest.

In order to produce the inflation state, a high pressure is fed to the orifice 2, this high pressure being for example that of the inflating fluid. The establishment of the high pressure through the passage 9 and the chamber 8 ceases the opening of the valve 5, and also through the passage 19, the opening of the valve 20 so that the pressure reaches, through the passage 22, the diaphram 11 which causes the closure of the escape valve 10. A little later, in the course of the pressure rise, the valve 17 is urged back and the fluid under pressure enters, through the passage 16, the chamber 15 and thence travels through the opened valve 5 and the orifice 6 and reaches the tire, the escape being rendered impossible by the prior closure of the valve 10. The inflation is then pursued as long as the high pressure is maintained. When this pressure is interrupted, the various valves are shifted in the opposite direction and the device returns to the state of rest, this device being purged through the opening of the escape valve. Expressed in more detail, the suppression of the high pressure causes the closure of the valve 17, and then the closure of the valve 20 and consequently the opening of the escape valve 10 so that the fluid under pressure in the chamber 15, the passage 14, and the chamber 13, escapes through the orifice 4, a slight leakage from the tire occurring until the drop in pressure causes the closure of the valve 5. This is achieved owing to the appropriate ratio of the areas between the outer active surface of the valve diaphragm 20 and that of the conduit 19 and to a suitable choice of the force of the spring 21.

There will now be described in more detail a practical embodiment of this device and its application to the selective inflation and deflation of tires of a multi-wheeled vehicle when stationary or in motion.

Figure 6:
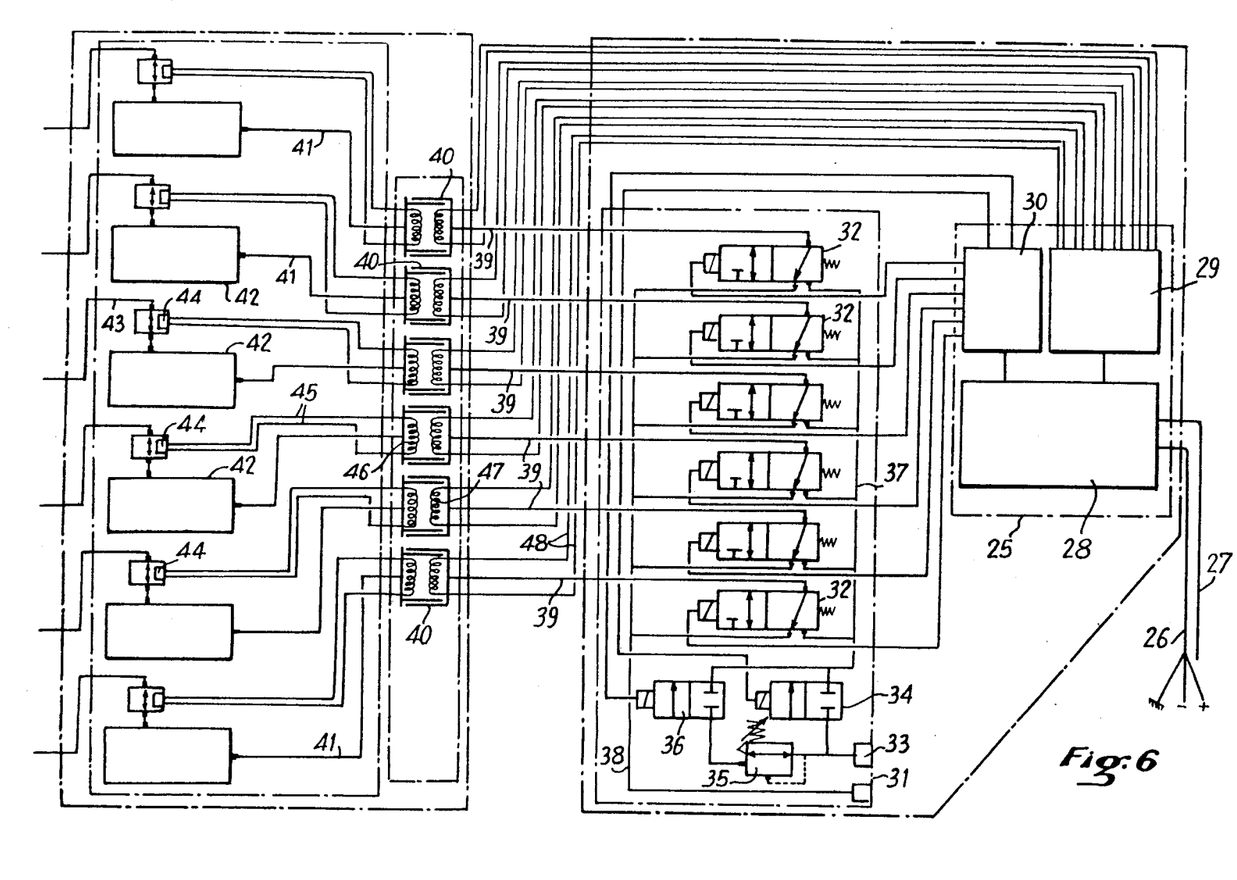
FIG. 6 is a diagrammatic view of the control calculator of this last-mentioned installation.

Reference will be made to FIG. 6.

The inflation and deflation system is placed on a vehicle having six wheels. It comprises an electronic control unit 25 supplied with power by an electric supply line 26 and capable of receiving through the inputs 27 instructions from the driver of the vehicle by means of buttons, levers, etc... known per se. The unit 25 includes a calculator 28 fed by a receiver unit and analyzes the pressure of the tires 29 so as to process these items of information and, depending on the instructions received through the inputs 27, to send instructions to a generator 30 of orders to effect inflation and deflation. This generator controls or pilots a pneumatic directional valve unit 31 comprising six three-way electrovalves 32 individually controlling the tires. The source of high pressure 33 is connected, on one hand, to a two-way electrovalve 34 and, on the other hand, to a pressure reducing valve 35 connected to a second two-way electrovalve 36. In order to inject high pressure into a given tire, the calculator will therefore control the electrovalve 34 which will feed the high pressure through a supply conduit 37 common to the various tire control electrovalves 32 of which only those which are actuated by the calculator will permit the passage of the high pressure to their respective tires. On the other hand, for sending a low-pressure instruction, the calculator 28 actuates the electrovalve 36 which, as it is supplied with low pressure through the pressure reducing valve 35, distributes the low pressure against through the line 37 and thence through the controlled electrovalve(s) 32, to the concerned tires.

The electrovalves 32 are purged through a common manifold 38.

Extending from each supply electrovalve 32 is a pipe 39 which leads to the central part of the axle of the corresponding wheel and is connected through a conventional rotating coupling 40 to a wheel pipe 41 which extends radially to a control device 42 of the type described hereinbefore.

The device 42 is put in communication on each of the wheels with the interior of the inner tube of the tire through a conduit 43 in which is inserted a pressure sensor 44 of a type for example described in French Pat. No. 2,497,342 filed by the applicant. This pressure sensor has its own processing circuit and transmits the signals it measures through wheel conductors 45 to the secondary winding 46 of a rotating transformer disposed in the region of the rotating coupling 40, the fixed primary winding 47 of which is disposed in facing relation and is connected through electric conductors 48 to the unit receiving and analyzing the pressures of the tires 29.

It is therefore possible to inflate and deflate the wheel tires individually without having to maintain constantly a pressure in the pipes 39, 41 and the rotating coupling 40 while constantly checking the state of the pressure in each of the vehicle wheels, for example ensuring that the pressure of the tires conforms to a desired pressure value by means of the calculator 28 while detecting leaks and punctures.

The escape of air from the various tires occurs in the devices 42 without any escape pipe so that there is no risk of a plugging of the escape by frost.

The operation of the device will be easily understood from the reading of the operation of the device shown in FIGS. 1 and 5. In the application in accordance with the invention to the inflation and deflation of vehicle tires, there may be indicated by way of example the following pressure values:

Low pressure: 1.5 bars
Opening of the control valve 20: 2.5 bars
Opening of the calibrated valve 17: 3.8 bars
High pressure at its maximum value (inflation): 10 bars Although the invention has been described with regard to particular embodiments, it must be understood that it is in no way limited thereto and that various modifications may be made therein as to design or materials without departing from the spirit or scope of the invention defined in the appended claims. Thus, for example, the electrovalves may be replaced by valves actuated in some other way.

We claim:

1. A device for controlling hydraulic or pneumatic pressure adapted to be interposed between a source of pressure, a utilization chamber and an escape, so as to ensure a feeding of fluid under pressure to said chamber or reservoir, and a discharge of the fluid under pressure from said reservoir to the escape, said device comprising a single body including a first orifice arranged to be connected to the source of pressure, a second orifice arranged to be connected to the utilization reservoir, a third, escape orifice, means responsive to a first control pressure, of low value, for connecting the utilization reservoir to the escape orifice, means responsive to a second pressure, of high value, for putting said second orifice in communication with the source of pressure and for preventing communication between said second orifice and the escape orifice, and a short passage of relatively large cross section, unconnected to said first orifice, directly connecting said escape orifice and said second orifice together.

2. A device according to claim 1, further comprising a valve control chamber arranged to be connected to means for establishing said first control pressure and a valve means controllable in response to the pressure established in said valve control chamber for normally closing said third escape orifice.

3. Device according to claim 1, wherein said device comprises a plurality of chambers which must be purged, said chambers being in communication with said first orifice so as to be purged by a general purge produced by a pipe connected to said first orifice.

4. A device according to claim 1, wherein a valve control chamber is connected to said first orifice through a passage.

5. A device according to claim 4, wherein said valve control chamber is the sole chamber to be purged.

6. A device according to claim 1, further comprising a passage between the first orifice and the second orifice and a first valve for normally closing said passage such that the first low control pressure is incapable of causing opening thereof.

7. A device according to claim 6, wherein the second orifice is connected to an escape valve through a normally open escape passage and said device further comprises a further valve for closing said escape passage which is not responsive to the first low control pressure but is responsive to the second pressure of high value for providing inflation.

8. A device according to claim 7, further comprising a mechanical connection between said further valve and the first valve for closing the passage between the first orifice and the second orifice, for providing that the passage between the first orifice and the second orifice is closed when the passage between the second orifice and the escape orifice is open and vice versa.

9. A device according to claim 7, wherein the shape and arrangement of the passage between the first orifice and the second orifice is such that the high pressure is delayed in reaching the region of said second orifice.

10. A device according to claim 1 wherein said body is formed by a housing comprising two parts disposed on each side of a diaphragm carrying said pressure responsive means.

11. A device according to claim 10, further comprising an escape valve disposed on one side of the diaphragm and a chamber controlling said escape valve disposed on the other side, said first orifice and a first valve closing the passage between the first orifice and the second orifice being disposed on one side of the diaphragm, and the second orifice and a further valve closing the passage between said second orifice and the escape orifice being disposed on the other side of the diaphragm.

12. A device according to claim 1, further comprising means for closing the escape in such manner that, in the absence of any pressure, the escape orifice is open while the utilization orifice is closed.

13. A device according to claim 12, further comprising a utilization valve closed in the state of rest thereof, for closing said second orifice, said utilization valve being responsive to an action of a low or high pressure established in a control chamber directly connected to the first orifice, an escape valve which is normally open but is capable of closing said third orifice for closing a connection passage between the second orifice and the third orifice, a normally-closed control valve for closing a passage between the first orifice and a control chamber of the escape valve, and capable of closing said third orifice and a calibrated valve normally closing a passage between said first orifice and said second orifice, and only capable of being opened when the pressure reaches a sufficiently high value after the escape valve has been brought to its closed position.

14. A device according to claim 12, further comprising a dead chamber in communication with atmospheric pressure.

15. A device according to claim 1 further comprising connection means for enabling the first orifice to feed the low pressure and the high pressure to the device.

16. A device according to claim 1, wherein said means responsive to a second pressure comprises a plurality of diaphragm valves.

17. In a system for regulating pressure of pneumatic tires of a vehicle in motion, said system comprising a plurality of devices each comprising a single body including a first orifice arranged to be connected to a source of pressure, a second orifice arranged to be connected to a pneumatic tire, a third, escape orifice, means responsive to a first control pressure, of low value, for connecting the pneumatic tire to the escape orifice, means responsive to a second pressure, of higher value, for putting said second orifice in communication with the source of pressure and for preventing communication between said second orifice and said escape orifice, and a short passage of relatively large cross section, unconnected to said first orifice, directly connecting said escape orifice and said second orifice together, each of said devices being mounted on a vehicle wheel carrying the tire or a group of tires to be inflated.

18. A system according to claim 17, wherein the tire provided with each said device is connected through a rotating coupling to a pipe connected to means for establishing the control pressure of low value, to means establishing the pressure of high value, and to a general purge.

19. A system according to claim 18 further comprising a pressure unit responsive to the value of the pressure in the pipe.

20. A system according to claim 17, wherein the device is connected to said high and low measure establishing means and said general purge through a selecting valve.

21. A system according to claim 17, further comprising means, associated with each tire, for measuring internal pressure and capable of delivering signals corresponding to a detected pressure to a chassis of the vehicle through a coupling.

22. A system according to claim 17 further comprising, mounted on a vehicle chassis, a source of pressure for supplying pressure, on one hand, to a high-pressure electrovalve, and, on the other hand, through a low pressure regulator to a low pressure electrovalve, said high pressure electrovalve being connected to a plurality of selecting electrovalves each assigned to each tire or group of tires through an inflation conduit, said low pressure electrovalve being connected also to said electrovalves associated with each tire or group of tires through a second conduit, the electrovalves being connected to a wheel through a rotating coupling.

23. A system according to claim 17 wherein individual said devices are each connected through a single pipe to central control means capable of being controlled by an operator and connected to a source of fluid under pressure, said central control means being so arranged as to be capable of establishing three states in said pipes, said states comprising a state of rest in which the pipes are at ambient pressure, a state of low pressure higher than the ambient pressure, and a state of high pressure corresponding to the supply pressure.

24. A system according to claim further comprising a central control calculator for controlling said plurality of electrovalves responsive to the pressure-measuring units and capable of controlling said electrovalves in accordance with the following sequences:

for measuring pressure: feeding a high pressure pulse in a pipe leading to a wheel and then blocking said pipe and measuring the pressure in an region of said pipe;

for deflation: measuring pressure in a region of the pipe and then feeding a low pressure pulse in the pipe for a given duration;

for inflation: measuring pressure in the region of the pipe and then feeding a high pressure in the pipe for the given duration, then measuring and then, adjusting by successive inflation or deflation.

25. A system according to claim 24, wherein the central calculator is arranged to calculate, as a function of the pressure measured in the tires and of the inflating or deflating pressure, a given duration as a function stored algorithm, during which duration an inflating or deflating state is effected.

* * * * *